Jan. 30, 1951 L. Z. LA FOREST 2,539,515

PHONOGRAPH SYSTEM

Filed Sept. 17, 1946 2 Sheets-Sheet 1

INVENTOR.
Louis Z. LaForest
BY Henry Lanahan
ATTORNEY

PHONOGRAPH SYSTEM

Filed Sept. 17, 1946 2 Sheets-Sheet 2

INVENTOR
Louis Z. LaForest
By Harry Lanahan
ATTORNEY

Patented Jan. 30, 1951

2,539,515

UNITED STATES PATENT OFFICE 2,539,515

PHONOGRAPH SYSTEM

Louis Z. La Forest, Parsippany, N. J., assignor to Thomas A. Edison, Incorporated, West Orange, N. J., a corporation of New Jersey Application September 17, 1946, Serial No. 697,487

15 Claims. (Cl. 179—6)

This invention relates to phonograph systems which are adapted for the selective recordation of signals from different sources. More particularly, the invention relates to an improved phonograph system for selectively recording dictation or telephone conversations.

Heretofore phonographic recording machines of the character mentioned have employed manipulative controls for connecting the phonograph to one or another of the several signal sources—for example to a telephone or a dictation microphone—and for conditioning the machine for recording the selected source as shown for example by Dunning Patent No. 2,305,681. This conditioning is, for example, to place the record carrier in continuous rotation during recordation of telephone conversations because of the continuity of those conversations, and to condition the phonograph drive system for quick start-and-stop rotation of the record carrier when it is desired to record dictation because of the frequent interruptions characterizing dictated matter. Since this selective conditioning of the phonograph system has been carried out by an independent manipulation of a control for this purpose, an inadvertent failure by the operator to properly adjust this control will result in a complete failure of the phonograph to carry out the intended recording operation.

It is an object of the present invention to eliminate the need for the operator to make any independent control manipulation on the machine to condition it for the recordation of a selected one of several signal sources.

It is another object to provide automatic means for conditioning the phonograph so that it will record telephone conversations as an incident to the use of the telephone instrument and for conditioning the phonograph for recording dictation as an incident to the use of the dictation microphone.

It is a further object of my invention to provide means for automatically conditioning a phonograph for recording sound signals from one of a plurality of sources as an incident of the removal of a hand microphone from its support adapted for picking up the sounds from the selected source.

Another object is to provide means for automatically setting the recording speed of the phonograph record carrier, to suit the requirements of the particular recording operation, as an incident to the selection of the sound source.

It is another object of my invention to provide novel means for regulating the speed of the phonograph record carrier so that it may properly reproduce recordations made at different record speeds.

It is a further object to provide in a phonograph a dual control arrangement whereby the phonograph may be started or stopped from different stations at which it is desired to record signals of different character.

Other and allied objects of my invention will more fully appear from the following description and the appended claims.

In the description of my invention reference is had to the accompanying drawings, of which:

Figures 1, 2, 3, 4:
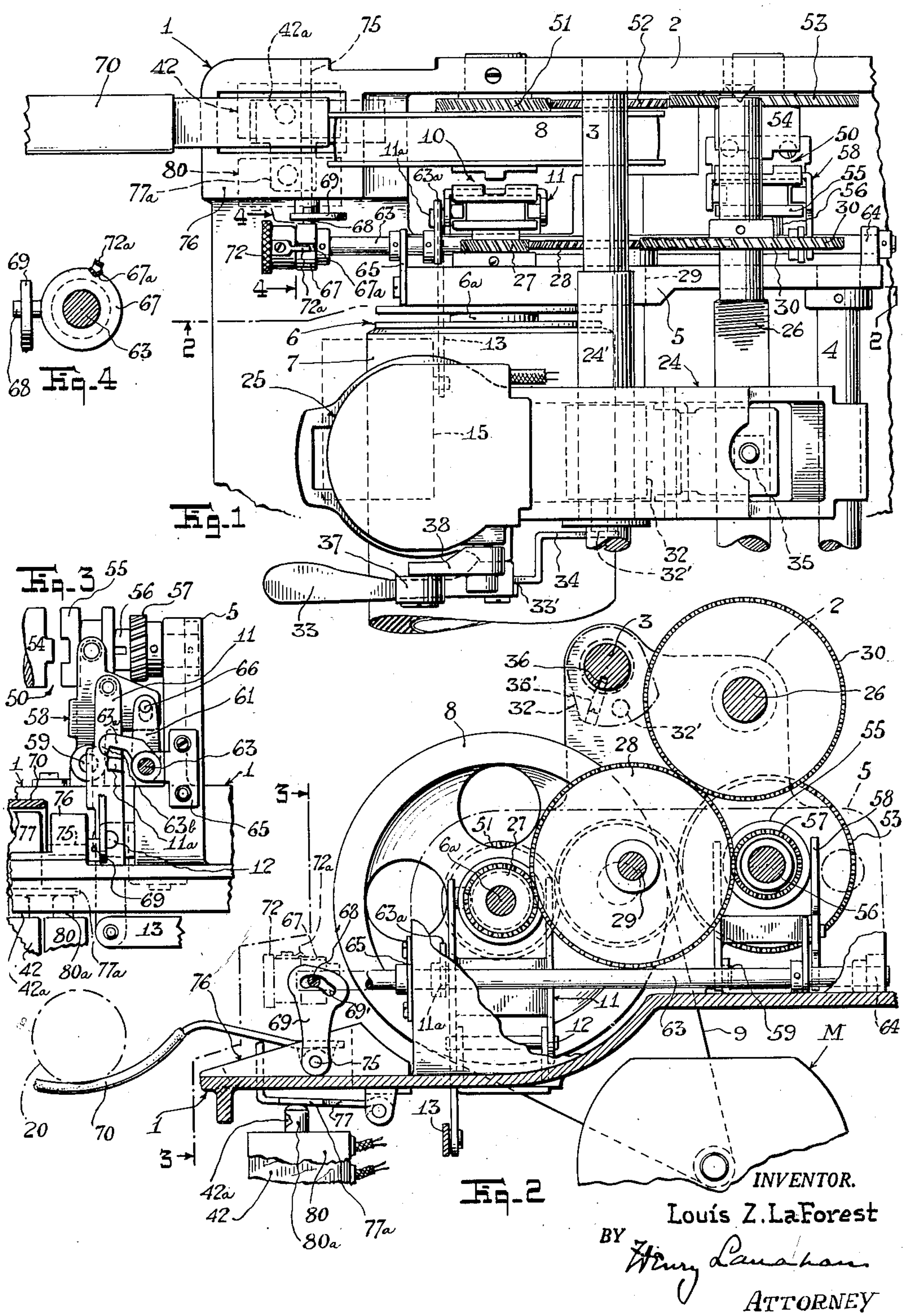
Figure 1 is a partial plan view of a phonograph embodying my invention.
Figure 2 is a sectional view taken substantially on the line 2—2 of Figure 1.
Figure 3 is a fragmentary front elevational view taken substantially on the line 3—3 of Figure 2.
Figure 4 is a fragmentary sectional view taken substantially on the line 4—4 of Figure 1.

In Figures 1 and 2 there is a fractional showing of a conventional phonograph of the dictating-machine type. This phonograph has a top frame plate 1 that is typically mounted in a suitable cabinet (not shown). This plate has left and right standards 2, of which only the left standard is shown, for supporting two cross rods 3 and 4, and it has an intermediate standard 5 for supporting a record carrier 6 herein shown by way of example as a mandrel adapted for carrying a cylindrical record 7. The record carrier 6 is rotated by a motor M located below the frame plate 1, the motor being coupled by a belt 9 to a pulley 8 that is journalled to the left standard 2 at a point axially in line with the shaft 6a of the record carrier. The coupling of the record carrier to the pulley 8 is effected according to the present embodiment of my invention by either one or the other of two coupling means. The main coupling means—i. e., the one used for dictation recording only—comprises a clutch 10 which is operated by a double-armed lever 11 that is pivoted to the plate 1 at 12. This lever 11 is coupled by a link 13 to the armature of an electromagnetic actuating device 14 enclosed for instance in a box 15 below the frame 1. This actuating device is preferably of the form disclosed in the Langley Patent No. 1,380,486 issued June 7, 1921. Since this device is well known in the art it is sufficiently shown in the present application by the diagrammatic view thereof appearing in Figures 1 and 5. The device comprises start and stop coils 16 and 17 which are selectively energized to actuate an armature 18 that is connected to the link 13 above mentioned. The current energization of the coils of this device is controlled by a hand switch 19 mounted typically on a hand type of dictation microphone 20 as indicated in Figure 1.

A carriage 24 for a record-cooperable translating device 25 is mounted slidably on the rods 3 and 4 for traveling movement along the record 7. This movement is produced by means of a feed screw 26 rotatably mounted in parallel relation to the rods 3 and 4 on the standards 2. The feed screw is rotated in a fixed speed relationship to that of the record carrier by gearing comprising a pinion 27 on the shaft 6a, an intermediate gear 28 journalled at 29 to the standard 5 and a gear 30 pinned to the feed screw. The carriage 24 has a sleeve 24′ forming a long bearing for the carriage on the rod 3. On this sleeve, within the hollow portion of the carriage, there is pivoted a cam member 32 which is turned on the sleeve by a hand lever 33. This lever is coupled to the cam member by a link 34 pivoted to the lever at 33′ and to the cam member at 32′. The cam member 32 controls the engagement and disengagement of a feed nut 35 with and from the feed screw 26; moreover, the cam member is splined to the rod 3 so that the rod is turned therewith as the hand lever is moved. This splining is effected by a key 36′ passing freely through the sleeve and engaging a slot 36 in the rod, the purpose for turning the rod being hereinafter described.

The hand lever 33 is coupled to the translating device 24 to shift the device between recording and reproducing conditions. Preferably, a translating device and control mechanism therefor is employed such as is shown and claimed in the pending joint application of Charles W. Dann and Richard M. Somers, Serial No. 604,316, filed July 11, 1945 and assigned to the present assignee. It will be understood however that my invention is not limited as to the type or construction of the translating device or the manner in which it is controlled other than that preferably I employ a translating device of the electrical type—for example, piezoelectric—as shown by that pending application. For the present purposes, it is sufficient to state that the translating device has a pivoted control arm 38 (Figure 1) which has a roller 37 at its free end overlying the hand lever 33 and biased thereagainst so as to receive movement therefrom as the hand lever is adjusted between so-called recording and reproducing positions.

As shown in Figures 1, 2 and 3, the present embodiment includes an alternative coupling means between the pulley 8 and the record carrier 6. This alternative coupling means, which is used during the recordation of telephone conversations as is hereinafter fully explained, comprises a clutch 50. Power from the pulley 8 is taken by way of a pinion 51 on this pulley, an intermediate gear 52 and a gear 53 that is journalled to the frame 2 shown in Figure 1. The gear 53 has an axially-extending sleeve 54 which forms one element of the clutch 50. In axial alignment with the element 54 is a movable clutch member 55 which is keyed to a stub shaft 56 journalled to the standard 5 (Figure 3). Pinned to the shaft 56 is a pinion gear 57 meshing with the aforementioned intermediate gear 28. When the clutch elements 54 and 55 are engaged, the pulley 8 is coupled to the record carrier to rotate the latter in the same direction as when it is coupled to the pulley by the clutch 10. However, the pinion 51 and the gears 52 and 53 are so arranged that the speed of rotation of the record carrier when driven by way of the clutch 50 will be considerably less than when driven by way of the clutch 10. This feature of driving the record carrier at a slower speed during the recordation of telephone conversations is however not herein broadly claimed because the broader aspects thereof are described and claimed in the pending application of Richard M. Somers, Serial No. 632,183, now Patent No. 2,535,657 dated December 26, 1950 and having a common assignee with the present application.

The clutch 50 is automatically controlled so that it is normally engaged whenever the phonograph is to be used for the recordation of telephone conversations. The control mechanism comprises a member 58 which is pivoted at 59 to a bracket on the frame plate 1. The member 58 is actuated by an arm 61 secured to a shaft 63. This shaft extends along the standard 5 to the front of the machine and is journalled in a rear boss 64 and a front bracket 65 as shown in Figures 1 and 2. The arm 61 has a pin and slot connection 66 with the member 58 through which the turning of the shaft 63 will cause an engagement, or disengagement, of the clutch 50 according to the direction of movement of the shaft. On the forward end portion of the shaft 63 there is pivotally mounted a collar 67 that is provided with a radially-extending pin 68. This pin engages a cam slot 69′ provided in the upper portion of a rocking plate 69 which is pinned to a small transverse shaft 75 that is journalled in a boss 76 of the frame plate 1. Although the collar 67 is mounted loosely on the shaft 63 it has a releasable connection thereto. This connection comprises a knob 72 pinned to the front end of the shaft and a spring finger 72a on the knob which engages a peripheral notch 67a in the collar as shown in Figure 4. This releasable connection is provided so that the relative angular positioning of the collar to the shaft 63 may be varied for the purpose hereinafter explained.

The plate 69 abovementioned is rocked in unison with a hook-shaped member 70 which is pivoted to the front part of the frame plate and used for supporting the dictation microphone 20 during periods when the microphone is not in use. Such a support member is old in the art and is known to serve a double purpose, which is to support the hand microphone and to tilt downwardly as the hand microphone is placed thereon to operate a control such as the switch 42. In the present embodiment the support member 70 is pinned to the shaft 75 and moved in unison with the plate 69. Below the support member 70 and underneath the frame 1, there is provided a flat pivoted lever 77 which has an upstanding portion abutting with the member 70 and also a horizontal portion in contact with an abutment 42a of the switch 42. The abutment 42a of the switch 42 is constantly urged upwardly with a sufficient force to hold the support member 70 in a raised position and the switch in a closed position when the hand microphone is off the support. When the switch is closed a power supply circuit 78 (Figure 5) for the motor M is closed and the motor is then energized to drive the pulley 8. However, the biasing force of the switch button 42a is insufficient to support the weight of the hand microphone 20. Consequently, the switch is in open condition and the motor M is at a standstill when the hand microphone 20 is on its support.

It will be understood from the foregoing description that a movement of the support member 70 causes the shaft 63 to be turned by way of the plate 69, pin 68, collar 67 and associated knob 72. Accordingly, when the hand microphone 20 is placed on the support, the rod 63 is turned counterclockwise as viewed in Figure 3 to engage the clutch 50. Since the hand microphone 20 is supported normally by the member 70 whenever the phonograph is not used for the recordation of dictation, the clutch 50 stands normally engaged and is ready to cause continuous rotation of the record carrier whenever the operator desires to record telephone conversations as will be hereinafter fully apparent.

Precautionary means is provided to prevent the engagement of both the clutches 10 and 50 at the same time. This means comprises a pawl 63a pinned to the rod 63 as shown in Figure 3. This pawl engages a lug 11a on the lever 11 and locks the clutch 10 in disengaged position whenever the clutch 50 is engaged. Reversely, the lug underlies the tip of the pawl and prevents the engagement of the clutch 50 whenever the clutch 10 is engaged.

In the present embodiment, a switch 80 is placed adjacent to the switch 42. The switch 80 is of a shielded type and has an actuating button 80a adapted to be contacted and moved by an extension 77a of the pivoted member 77, it being understood that the combined biasing force of both buttons 42a and 80a is insufficient to support the weight of the hand microphone 20 in order that both switches will be held in their open conditions when the microphone is at rest on the support 70. When the switch 80 is in its open position it opens the microphone circuit 81a. This circuit is connected by leads 81 to a multipole switch 41 which is for connecting the circuits of the phonograph for recording or reproducing purposes as will hereinafter appear.

Figure 5:
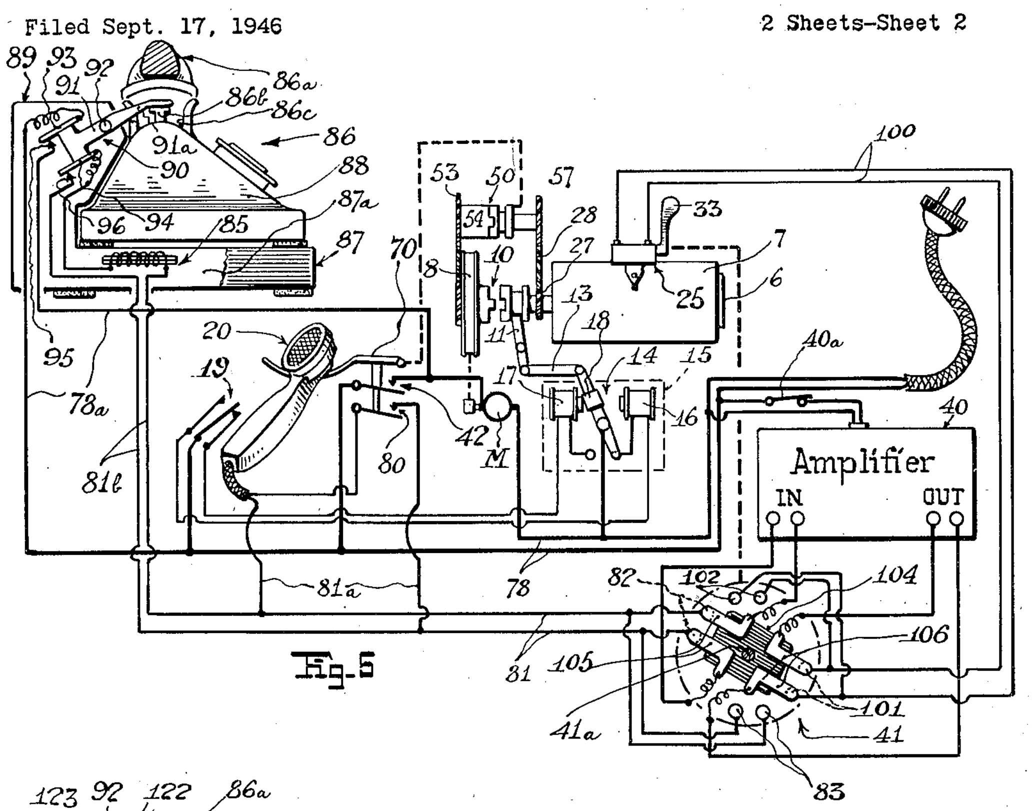
Figure 5 is a schematic diagram of my invention as incorporated in the phonograph shown in the foregoing figures.

The telephone from which the recordation of telephone conversations is to be made comprises for example a hand-combination desk set 86. In proximity to the telephone box 88 there is placed a magnetic pickup device 85. Preferably the telephone box is placed on a stand 87 and the pickup is mounted within the base of this stand. The stand 87 is provided with a rearward upstanding portion 89 for supporting a switch 90. The switch 90, as in the case of the switches 42 and 80, is operated automatically by the mounting and removal of the hand set 86a of the telephone in connection with its supporting cradle 86c, it being understood that the hand set includes the usual telephone microphone and receiver. This automatic operation of the switch 90 is accomplished by providing the switch with an arm 91 pivoted at 92 and extending forwardly at 91a to rest upon the plunger switch 86b of the telephone (Figure 5). The pivoted arm 91 has a rear extension carrying a pair of insulated contact members 93 and 94 which contact respective stationary switch points 95 and 96 diagrammatically shown. The switch 90 is of the double-pole single-throw variety and is adapted to open and close the circuits indicated at 78a and 81b. The circuit 78a is in parallel with the supply circuit 78 aforementioned and the circuit 81b is in parallel with a voice circuit formed by the leads 81. In Figure 5 the telephone hand set 86a is shown slightly raised and accordingly the circuits 78a and 81b are closed by the switch 90 due to the upward movement of the telephone plunger switch 86b. However, as the hand set is placed in the cradle the arm 91 is rocked downwardly and the switch 90 is opened. Thus the switch 90 controls the operation of the motor M and the connection of the pickup 85 to the circuit 81.

Connected to the amplifier through the switch 41 is a circuit 100 leading to the translating device 25. A connection of this circuit through the switch 41 may be effected alternately by the pairs of terminals 101 and 102. The switch 41 is preferably of the rotary type and is for the purpose of changing the circuits 100 and 81 from the input to the output of the amplifier, or vice versa, so that the amplifier may serve to amplify the signal currents from the dictation microphone or telephone during recording and from the translating device during reproducing, the switch 41 being controlled by the hand lever 33 by way of the rod 3 and a suitable coupling means 103 (schematically shown) which couples the central shaft 41a of the switch thereto. The shaft 41a may carry an insulating plate 104 having the contact pairs 105 and 106 respectively connected to the input and output of the amplifier. Accordingly, if the plate 104 is turned clockwise as shown in Figure 5 the pair of contacts 105 will be moved to engage the respective terminals 102 and the pair of contacts 106 will be moved to engage the respective terminals 83 to reverse the connection of the amplifier 40 so that the circuit 100 will be connected to the input and the circuit 81 to the output of the amplifier. In the power supply circuit of the phonograph there is a switch 40a for connecting the amplifier 40 thereto. This switch is normally left closed when the phonograph is on stand-by operation for either the recordation of telephone conversations or of dictation. Also during stand-by, the hand set 86a is normally resting in the cradle 86c and the hand microphone on the support 70. Upon then removing the hand set from the cradle, as is necessary when the telephone is to be used, or upon removing the hand microphone 20 from its support, as is necessary when the phonograph is to be used for the recordation of dictation, the microphone which is so selected is automatically connected to the phonograph and the phonograph drive system is conditioned for operation. This conditioning involves placing the drive system in continuous effective operation as the hand set is removed—that is, an operation wherein the record carrier is in cont n ous rotation—and involves starting the motor M and placing the clutch 10 under the control of the hand switch 19 for quick start-stop rotation of the record carrier when the hand microphone 20 is removed from its support. For example, if the hand set 86a is removed while the hand microphone 20 is on its support the switch 90 is closed to start rotation of the record 7 by way of the clutch 50, which is now being held engaged by the weight of the hand piece 20 on the support 70; also, the closing of the switch 90 connects the pickup 85 to the circuit 81 and thus through the amplifier to the translating device 25. Moreover, as aforementioned, during the recordation of telephone conversations the record carrier is turned at a slower speed than for the recordation of dictation. This is done so as to get a longer time of recordation on a given record. While this expedient entails some sacrifice in the quality of the recording, it is generally permissible in the recordation of telephone conversations as is pointed out in the Somers application Serial No. 632,183 aforementioned. On the other hand, if the hand microphone 20 is removed from the support 70, the upward movement of the support will at first disengage the clutch 50 and remove the lock on the clutch 10 to permit the latter to be engaged as the hand switch 19 is operated; also, the switches 42 and 80 are closed to start the motor M and to connect the hand microphone to the circuit 81 and thus through the amplifier to the translating device 25.

When the lever 33 is moved to condition the phonograph for reproducing the translating device is shifted to a reproducing condition and the rod 3 is turned to shift the switch 41 so as to connect the microphone 20 to the output of the amplifier and the translating device to the input, the microphone being then employed as a receiver. The switch 19 is then used to control the clutch 10 to start and stop rotation of the record. It is to be noted however that the recorded matter to be reproduced may have been recorded at the lower speed employed in the recordation of telephone conversations and that it may then be necessary to rotate the record at an accordingly slower speed during the reproduction thereof. In this event, the switch 19 is not used. Instead, the clutch 50 is engaged by turning the knob 72. The spring finger 72*a* is moved out of the notch 67*a* of the collar 67 as this is done. After the reproducing operation, the knob is returned either manually to its normal position or, if the microphone 20 is placed on the support 70, this return is effected automatically by way of the shaft 75 and plate 69.

Figure 6:
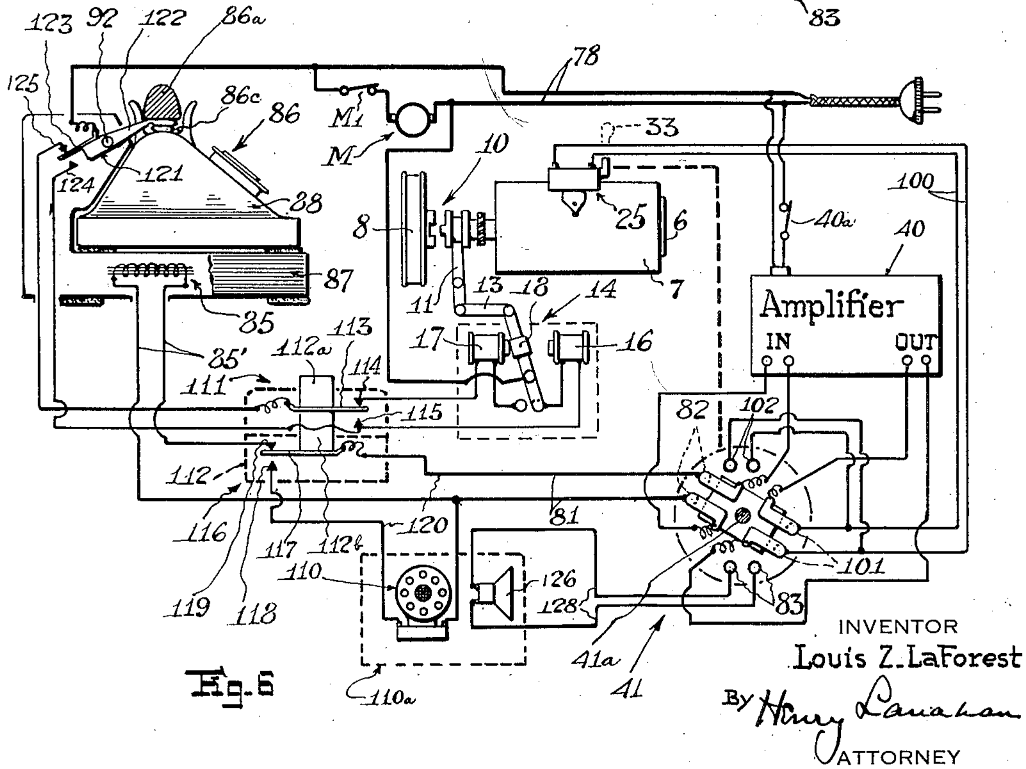
Figure 6 is another schematic diagram showing a different embodiment of my invention.

In Figure 6 there is shown a second embodiment of my invention which is arranged also to permit the selective recordation of matter from a plurality of sources without the requirement that any independent selecting operation be performed. The parts of the system which correspond with those of the previous embodiment are referred to by corresponding reference characters. In the instant embodiment, the phonograph has only the clutch 10 for controlling the rotation of the record 7. At the dictation-recording station there is a stationary microphone 110, which is not intended for hand use but is fixed in location as on a desk. Also, at this station there is a start-stop control for the clutch 10. This is in the form of a foot-operated switch referred to as 111. This switch has a housing 112 from which projects a spring-urged plunger 112*a* carrying a pole member 113 normally contacting the upper terminal 114 which is associated with the stop coil 17 of the electromagnetic actuating device 14. When the operator wishes to start the rotation of the record, he presses the member 112*a* to cause the pole member 113 to make contact with a terminal 115 which is associated with the start coil of the actuating device 14.

Also, there is provided in the housing 112 another switch 116. This switch is electrically shielded from the first switch 111 and is operated also by the plunger 112*a*. For this purpose, the plunger 112*a* has an extension 112*b* insulatedly carrying a pole member 117. This member is moved between two terminals 118 and 119 which are respectively associated with the voice circuit 120 of the microphone 110 and the voice circuit 85′ of the telephone pickup 85.

Mounted on the pivot 92 at the telephone desk set 86 is an arm 121 having an extension 122 terminating within the cradle 86*c* for operation by the telephone hand set 86*a* as in the manner described in connection with the foregoing embodiment. At the rear of the pivot 92, the arm 121 carries an insulated pole member 123 movable between two stationary terminals 124 and 125. The terminal 124 is connected through the terminal 115 of the foot switch 111 to the start coil 16 of the actuating device 14, and the terminal 125 is connected directly to the pole member 113 of the switch 111.

The present system is conditioned for instant operation by closing a switch M1 for the motor M and the switch 40*a* for the amplifier 40. Also, of course, the hand lever 33 is set to recording, or reproducing, position. If set at recording position, a recordation from either the telephone or the dictation microphone may be effected without exercising any independent selective operation of any control. For instance, if it is desired to record dictation, it is only necessary to press the plunger 112. This disconnects the circuit 85′ from the voice circuit and connects the dictation microphone to the translating device by way of the amplifier. At the same time, the switch 111 will close the circuit of the start coil of the device 14 and engage the clutch 10. On the other hand, if a telephone conversation is to be recorded, the mere removal of the hand set 86*a* from the cradle will cause the start coil 16 to be energized to engage the clutch 10 to cause continuous rotation of the record. Since the pole member 117 of the switch 116 is normally connected with the circuit 85′ of the pickup device 85, the voice signals of the latter are transmitted through the amplifier to the translating device and recorded on the record 7.

For reproducing purposes, the instant arrangement employs a speaker 126 which is preferably mounted adjacent to the microphone 110 within the single housing 110*a* for the two units. The speaker 126 has leads 128 connected directly with the aforementioned terminals 83 of the switch 41. Thus, when the phonograph is conditioned for reproducing, the switch 41 is rotated to cause connection of the speaker 126 and disconnection of the pickup 85. Under such condition, the plunger 112*a* of the switch 111 will serve only to control the rotation of the record.

While I have herein particularly shown and described certain preferred embodiments of my invention, these will be understood to be illustrative and not limitative thereof as the same is subject to changes and modifications without departure from the scope of my invention which I endeavor to express according to the following claims.

I claim:

1. In a phonograph system adapted for the recordation of speech characterized by frequent interruptions and of speech which is relatively continuous including a rotatable record carrier, a record-cooperable translating device and a start-stop control means placeable into effective condition to start and stop rotation of said record carrier at will; the combination of first and second microphones for said interrupted speech and relatively continuous speech respectively, supports for said microphones respectively, means operated incidental to the removal of said first microphone from its support for connecting the said microphone to said translating device and concurrently placing said start-stop control means into effective condition, and means associated with the support of said second microphone and operated incidental to the removal of the microphone therefrom while said first microphone is on its respective support for operatively connecting said second microphone to said translating device and concurrently placing said record carrier in rotation.

2. In a phonograph system adapted for the selective recordation of dictation and telephone conversations, including a rotatable record carrier, a record-cooperating translating device and a drive motor for said carrier: the combination of a hand-type dictation microphone, a hand-type telephone microphone, first and second supports for said dictation and telephone microphones respectively, means associated with said first support and responsive to removal therefrom of said dictation microphone for operatively connecting said dictation microphone to said translating device and starting said motor, and means associated with said second support and responsive to removal therefrom of said telephone microphone for operatively connecting said telephone microphone to said translating device and concurrently causing rotation of said record carrier by said motor.

3. In a phonograph system adapted for the selective recordation of sounds from different sources, said system including a rotatable record carrier, a drive for said carrier and a record-cooperating translating device: the combination of microphones for said sources respectively, respective supports for said microphones, circuits for connecting said translating device to said microphones respectively, switch means in said circuits respectively, means associated with each of said supports and operable by the respective one of said microphones upon removal of the microphone from its support for closing the respective switch means to connect the respective microphone to said translating device, and means associated with at least one of said supports for causing said record carrier to be rotated by said drive concurrently as the respective microphone is connected to said translating device.

4. In a phonograph system adapted for the selective recordation of subject matter of different character: the combination of a rotatable carrier, a drive system for said carrier, means for selectively conditioning said drive system to operate at different effective speeds, hand microphones for said different subject matters respectively, respective supports for said microphones, a first means controlled by one of said microphones as the same is removed from its support for conditioning said drive system for operation at one speed, and a second means controlled by a second one of said microphones as the same is removed from its support for conditioning said drive system for operation at a different speed.

5. The combination set forth in claim 4 wherein said second means is operatively connected with said first means to be effective only when said first microphone is on its support.

6. In a phonograph system adapted for the selective recordation of dictation and telephone conversations: the combination of a hand-type dictation microphone, a hand-type telephone microphone, supports for said microphone respectively, a rotatable record carrier, a drive system for said carrier, means for selectively conditioning said drive system to operate at higher and lower effective speeds, means associated with the support for said dictation microphone and controlled as an incident to the removal of the dictation microphone therefrom for conditioning said drive system for operation at higher speed, and means associated with the support for said telephone microphone and operated incidental to the removal of the telephone microphone therefrom for conditioning said drive system for operation at said lower speed.

7. In a phonograph system adapted for the selective recordation of matters of different character including a record carrier and a drive motor: the combination of a drive transmission including a clutch for coupling said motor to said carrier to drive the latter at one speed, a second drive transmission including a clutch for coupling said motor to said carrier to drive the latter at a different speed, means for operating said clutches respectively, and intercoupling means between said clutches for allowing only one of the clutches to be engaged at one time.

8. In a phonograph system adapted for recording dictation and other sounds comprising a dictating machine including a record carrier, a drive motor, a dictation microphone and a main clutch for coupling said motor to said carrier to drive the carrier at a given speed: the combination of a support on said machine for said microphone, a transmission including an auxiliary clutch for coupling said motor to said carrier and driving the carrier at a different speed, remote means for controlling said main clutch, and means associated with said support and effective when said microphone is resting thereon for disabling said main clutch and concurrently engaging said auxiliary clutch.

9. In a phonograph system adapted for the selective recordation of dictation and telephone conversations including a rotatable record carrier and a record-cooperating translating device: the combination of a drive system for said carrier conditionable for quick start-stop rotation of said carrier at one speed and for continuous rotation of the carrier at another speed, dictation and telephone microphones, supports for said microphones respectively, means associated with the support of said dictation microphone and operated upon removing the microphone therefrom for automatically conditioning said drive system for quick start-stop operation, and means associated with the support for said telephone microphone and operated upon removing the telephone microphone therefrom while said dictation microphone is on its support for operatively connecting the telephone microphone to said translating device and concurrently conditioning said drive system to cause continuous rotation of said record carrier.

10. In a phonographic recording system including a rotatable record carrier and a drive system for rotating said carrier: the combination of a start-stop control for said drive system operable to start and stop rotation of said record carrier, a telephone hand-type microphone, a support for holding the microphone when the same is not in use, means associated with said support for operation automatically upon removing said microphone from said support and replacing the same thereon to start and stop rotation of said record carrier, and means responsive to said start-stop control when the same is moved to start and stop positions for respectively abling and disabling said last-stated means.

11. In a phonographic recording system including a rotatable carrier for a record, a record-cooperable translating device and a drive system for said record carrier: the combination of a dictation microphone, a hand-type telephone microphone, a support for holding said telephone microphone when the same is not in use, a control device associated with said support and operated incidental to removal and replacement of said telephone microphone from and onto said support for respectively starting and stopping rotation of said record carrier, a start-stop control device biased into stop position for controlling the rotation of said record carrier during the recordation of dictation, said last-mentioned control device being operatively connected with said first-mentioned control device so as to be effective only when said telephone microphone is on its support, and means associated with said second control device for operatively connecting said dictation microphone to said translating device as the control device is moved into start position and for operatively connecting said telephone microphone to said translating device as the same is returned to stop position.

12. In a phonograph system adapted for the selective recordation of dictation and telephone conversations, including a rotatable record carrier, a record-cooperating translating device, a drive motor for said carrier, and hand-type dictation and telephone microphones: the combination of first and second supports for said dictation and telephone microphones respectively; clutch means for coupling said motor to said record carrier; start-stop means for said motor; means for engaging said clutch means; electrical control means associated with said first support and connected to said start-stop means and clutch-engaging means to cause said motor to be started when the dictation microphone is removed from said first support and to cause said motor to be stopped and said clutch means to be engaged when said dictation microphone is replaced on said support; and electrical control means associated with said second support and connected to said start-stop means to cause said motor to be started and stopped respectively as said telephone microphone is removed from and replaced on said record support.

13. In a combined telephone and dictation recording system, including a record carrier, a drive motor for moving said carrier and a clutch for coupling said motor to said carrier: the combination of dictation and telephone microphones, supports for said microphones respectively, means controlled by said dictation microphone as the same is placed on its support for engaging said clutch, and means controlled by said telephone microphone as the same is removed from its support for starting said motor.

14. In a combined telephone and dictation recording system, including a record carrier, a drive motor for moving said carrier and a clutch for coupling said motor to said carrier: the combination of dictation and telephone microphones, supports for said microphones respectively, means associated with the support for said dictation microphone and operated incidental to the removal of said dictation microphone therefrom and the replacing of said dictation microphone thereon for engaging and disengaging said clutch respectively, and means associated with the support for said telephone microphone and operated incidental to the removal of said telephone microphone therefrom and the replacing of the same thereon for starting and stopping said motor respectively.

15. In a combined telephone and dictation recording system including a record carrier: the combination of telephone and dictation microphones, a support for said telephone microphone, a dictation start-stop means for quick start-and-stop operation of said record carrier, means responsive to said start-stop means as the same is moved to "stop" position for disabling said dictation microphone, means associated with said support for operation automatically upon removing said telephone microphone therefrom and upon returning the same thereon to start and stop said carrier, and means controlled by said start-stop means for disabling said last-stated means when said start-stop means is in "start" position.

LOUIS Z. LA FOREST.

REFERENCES CITED

The following references are of record in the file of this patent:

UNITED STATES PATENTS

| Number | Name | Date |
|---|---|---|
| 2,079,089 | Varley | May 4, 1937 |
| 2,305,681 | Dunning | Dec. 22, 1942 |